(12) United States Patent
Norris et al.

(10) Patent No.: US 9,764,261 B2
(45) Date of Patent: Sep. 19, 2017

(54) DUAL MEDIA OIL FILTER

(71) Applicant: FORD GLOBAL TECHNOLOGIES, LLC, Dearborn, MI (US)

(72) Inventors: Kevin E. Norris, Saline, MI (US); Lev Pekarsky, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 599 days.

(21) Appl. No.: 14/219,684

(22) Filed: Mar. 19, 2014

(65) Prior Publication Data

US 2015/0265950 A1 Sep. 24, 2015

(51) Int. Cl.
*B01D 29/52* (2006.01)
*B01D 29/60* (2006.01)
(Continued)

(52) U.S. Cl.
CPC .............. *B01D 29/60* (2013.01); *B01D 29/01* (2013.01); *B01D 29/52* (2013.01);
(Continued)

(58) Field of Classification Search
CPC ........ B01D 29/01; B01D 29/52; B01D 29/60; B01D 35/005; B01D 35/147; B01D 35/1475; B01D 35/1573; B01D 35/1576; B01D 2201/12; B01D 2201/182; B01D 2201/188; F01M 1/10; F01M 2001/1057; F01M 2011/0029; F01M 2011/1092; F16H 57/0402; F16H 57/0404; F16K 1/18; F16K 15/03; F16K 15/033; F16K 17/02;
(Continued)

(56) References Cited

U.S. PATENT DOCUMENTS 7,875,171 B2 1/2011 Pekarsky et al.
7,997,293 B2 8/2011 Ruschke
(Continued)

FOREIGN PATENT DOCUMENTS

EP 2586511 A1 1/2013

OTHER PUBLICATIONS

FAQ, Flexi-Hinge Valve Company, 1999-2011 (retrieved on Jun. 25, 2016 from URL:http:/twww.flexihinge.com/index.php?option=com_content&view=article&id=26&1temid=30), 3 pages.*
(Continued)

*Primary Examiner* — Patrick Orme
(74) *Attorney, Agent, or Firm* — James Dottavio; Brooks Kushman P.C.

(57) ABSTRACT

A suction filter for an automatic transmission utilizes two different types of filter media: a coarse filter media and a fine filter media. The two types of media are arranged in series within a housing such that fluid flows through only one of the two filter media. A hinge valve is arranged in series with the coarse media. The hinge valve passively opens in response to a pressure differential. The hinge valve defines a non-zero flow area when in the closed position and an increasing flow area as it opens. The flow restriction associated with the hinge valve permits a larger ratio of coarse media area to fine media, thereby decreasing the flow restriction when the oil is cold without decreasing the clean-up rate in normal operating conditions.

18 Claims, 2 Drawing Sheets

(51) Int. Cl.
  B01D 35/157 (2006.01)
  B01D 29/01 (2006.01)
  *F16H 57/04* (2010.01)
  *F01M 1/10* (2006.01)

(52) U.S. Cl.
  CPC .... B01D 35/1573 (2013.01); *B01D 2201/188* (2013.01); *F01M 2001/1092* (2013.01); *F16H 57/0402* (2013.01)

(58) Field of Classification Search
  CPC ...... F16K 17/04; F16K 17/0413; F16K 17/06; F16K 31/12
  See application file for complete search history.

(56) References Cited

U.S. PATENT DOCUMENTS

| | | | |
|---|---|---|---|
| 7,998,347 B2* | 8/2011 | Pekarsky | B01D 29/05 210/167.01 |
| 2006/0180541 A1* | 8/2006 | Hueppchen | B01D 35/0273 210/450 |
| 2012/0305469 A1 | 12/2012 | Stausberg et al. | |
| 2013/0118964 A1 | 5/2013 | Dedering | |

OTHER PUBLICATIONS

Internet Archvie—Flexi-Hinge Valve Company, Feb. 10, 2010 (retrieved Dec. 18, 2016), 3 pages.*

* cited by examiner

DUAL MEDIA OIL FILTER

TECHNICAL FIELD

This disclosure relates to the field of fluid filters. More particularly, the disclosure pertains to a dual media filter having an internal valve.

BACKGROUND

Automotive transmissions typically use automatic transmission fluid for a variety of purposes including lubrication, heat transfer, and hydraulic actuation of shift elements. As the fluid circulates, it can pick up small particles. If not removed, these particles can damage various transmission components. Therefore, it is common to circulate the fluid through a filter. Various types of filtration media may be used. A screen mesh is only effective in removing relatively large particles. Therefore, it is common to use depth filter media. Depth filter media, unlike a screen mesh, retain particles throughout the media, rather than just on the surface.

As fluid flows through filtration media, some pressure drop occurs. The pressure drop increases as the flow rate per unit area increases. If the resistance is excessive, then the transmission pump will not circulate a sufficient quantity of fluid or the transmission pump may cavitate. This problem is most acute when the transmission is cold causing the fluid to have higher viscosity. Different types of filtration media offer different degrees of flow resistance per unit area. Typically, types of filtration media that are more effective in removing small particles tend to have higher resistance per unit area. Therefore, the design of a transmission filter assembly requires some compromise between filtration effectiveness and flow resistance. Flow resistance can be reduced without decreasing filtration effectiveness by increasing the area of filtration media. However, the space available for the filter assembly is limited. To package a large area of filtration media in a small filter housing, the media may be pleated.

SUMMARY OF THE DISCLOSURE

A filter assembly, suitable for use in an automatic transmission, includes a housing, coarse depth media, fine depth media, and a valve. The fine depth media has a higher resistance per unit area than the coarse depth media. Either or both types of depth media may be pleated. The valve is arranged in series with the coarse depth media. The fine depth media is arranged in parallel with the combination of the coarse depth media and the valve. The valve may establish a non-zero orifice area when in a closed position and an increasing orifice area, or equivalent orifice area, as the valve opens. The valve may be passively controlled. For example, the valve may open in response to increasing differential pressure above a threshold. The valve may be designed to be closed at normal operating temperatures and flow rates. The valve may be a hinge valve.

In another embodiment, a filter assembly includes a housing, first and second filter media within the housing, and a valve arranged in series with the first media and in parallel with the second media. The valve establishes a non-zero orifice area in a closed position and an increasing equivalent orifice area as the valve opens. The second filter media may have a higher resistance per unit area than the first filter media. The first and second filter media may be, for example, pleated depth media. The valve may be a hinge valve that passively opens in response to increasing differential pressure above a threshold.

In another embodiment, a filter assembly includes a housing, first and second filter media within the housing, and a hinge valve arranged in series with the first media and in parallel with the second media. The second filter media may have a higher resistance per unit area than the first filter media. The first and second filter media may be, for example, pleated depth media. The valve may be designed to establish a non-zero flow area in a closed position and an increasing flow area as the hinge valve opens.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
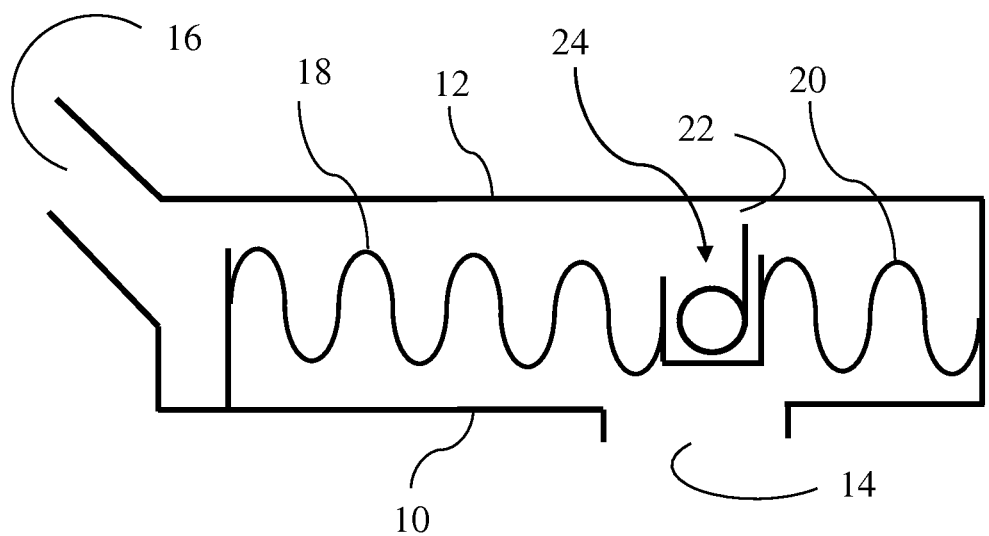
FIG. 1 is cross section of a transmission filter.

FIG. 1 is a cross section of a transmission filter assembly. The filter assembly is contained within a housing defined by a lower cover 10 and an upper cover 12. The filter assembly is installed within the transmission sump such that fluid can flow into the housing through inlet 14 in lower cover 10. Outlet 16 is connected to the transmission oil pump. The filter assembly provides two fluid flow paths from inlet 14 to outlet 16. Some of the fluid flows through fine filter media 18. The remainder of the fluid flows through course media 20 and orifice 22.

Components are said to be arranged in parallel when the fluid is divided with some flowing through one component and other fluid flowing through the other component. When components are arranged in parallel, the pressure drop across each component is equal to the pressure drop across the combination. The flow rate through each component is inversely proportional to the resistance of that component. The combined flow rate of the combination is equal to the sum of the flow rates through each component. On the other hand, components are said to be in series if fluid must pass through both components. In the filter assembly of FIG. 1, coarse media 20 and orifice 22 are arranged in series while fine media 18 and coarse media 20 are arranged in parallel. When components are arranged in series, the pressure drop across the combination is equal to the sum of the pressure drops across each component. The pressure drop across each component is proportional to the resistance of that component. The flow rate through each component is equal to the flow rate through the combination.

Figure 2:
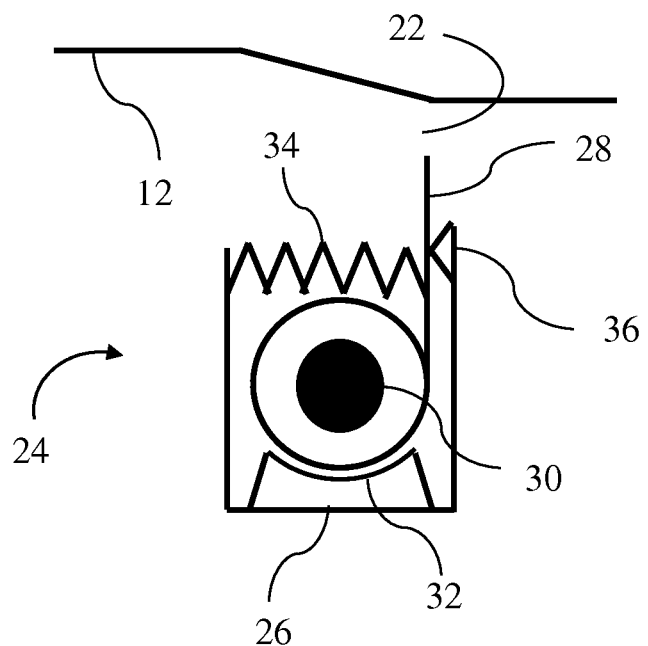
FIG. 2 is a cross section of the hinge valve of the filter of FIG. 1 in a closed position.

As fluid flows through orifice 22, some pressure drop occurs. Valve 24 passively adjusts the size of orifice 22 based on the pressure drop. FIG. 2 shows valve 24 in a closed position, as it would be when the pressure drop across orifice 22 is relatively low. Valve 24 is supported by support member 26 which is fixed to the housing in front of and behind the station through which this cross section is taken. Flap 28 is supported for rotation with respect to support member 26 by hinge 30. Seal 32 prevents parasitic flow around the valve hinge. Seal 32 minimizes parasitic flow by providing a relatively small clearance along a relatively long parasitic flow path. Flap 28 and upper cover 12 define orifice 22. Spring 34 holds flap 28 against stop 36. Although a linear spring is illustrated, a torsion spring may be utilized. In some embodiments, flap 28 may be flexible.

Figure 3:
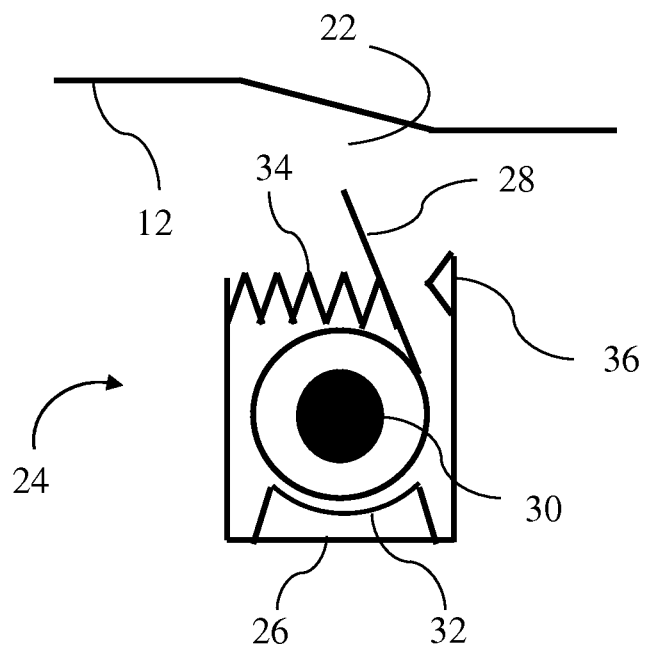
FIG. 3 is a cross section of the hinge valve of the filter of FIG. 1 in an open position.

FIG. 3 shows valve 24 in an open position. When the pressure drop across orifice 22 exceeds a threshold, fluid pressure against flap 28 overcomes the force applied by spring 34 and the flap moves on hinge 30. The threshold is determined by the area of flap 28 and by the spring of spring 34 and by the free length of spring 34 relative to its length in the closed position. As flap 28 moves, the size of orifice 22 increases.

In operation, some of the fluid flows through the fine filter media and some flows through the coarse filter media. Although some of the fluid does not go through the fine filter on a particular excursion through the filter assembly, over time all of the fluid will pass through the fine filter some of the time such that any small particles will eventually be removed. The rate at which small particles are removed from the fluid depends upon the fraction of the flow that passed through the fine filter media. The fraction of the flow that passes through the fine filter media 18 is determined by the relative resistance of the two types of media, the relative area of the two type of media, and the pressure drop across orifice 22.

When the transmission is operating at normal operating temperature and flow rate, the pressure drop across orifice 22 is below the threshold and valve 24 is in the closed position as illustrated in FIG. 2. Due to the pressure drop across the orifice, however, the fraction flowing through the fine filter media is higher than it would be if there were no flow restriction. For a particular flow fraction and fine media area, the area of the coarse media can be increased by decreasing the size of orifice 22 when valve 24 is closed.

Increasing the relative area of the coarse media provides an advantage when the transmission temperature is very low. When the temperature is very low, the fluid viscosity increases dramatically. This increase in fluid viscosity increases the flow resistance per unit area for both the fine and the coarse filter media. However, the resistance of the fine media tends to increase by substantially more than the resistance of the coarse media. For representative types of fine and coarse filter media, the ratio of the resistance per unit area is about 7 at normal operating temperature and 15 at very cold temperatures. By having proportionately more coarse media, the total resistance of the filter assembly increases less as temperature decreases. Opening of valve 24 in this condition further limits the increase in resistance. Consequently, fluid starvation at very low temperatures is avoided. Excessive resistance can also lead to pump cavitation at low temperatures, which is avoided with the proposed design. Although a smaller fraction of the flow will pass through the fine filter in this condition, very low temperature conditions are transient in nature. The flow fraction and clean-up rate return to their nominal values when the transmission reaches normal temperature. If the area of the coarse media were increased without orifice 22 and valve 24, then the flow fraction and clean-up rate in normal operating conditions would be degraded.

Although a hinged valve is illustrated, other types of valves such as poppet valves or reed valves may be substituted. However, hinged valves offer advantageous characteristics relative to other types of valves. The effective orifice area of a poppet valve tends to increase rapidly as the differential pressure increases above the threshold and then stop increasing at a pressure only slightly above the threshold. This binary behavior can lead to flow instability. For a hinge valve, the relationship between pressure differential and flow area is more nearly linear. In this application, the relationship can be tailored by manipulating the shape of upper cover 12 in the vicinity of orifice 22. Thus, flow instability is avoided. Also, a hinged valve is easily designed to provide a relatively large orifice size at a relatively low differential pressure.

Although the Figures illustrate a passive valve energized by a pressure differential, other means of adjusting the valve opening may be substituted. For example, the valve may be actively controlled by a transmission controller. Alternatively, the valve may open and close in response to changes in the fluid temperature. For example, the valve may respond to a change in volume of a wax that is formulated to change from solid to liquid state at a particular temperature.

Over time, the filter media may become clogged with particles, increasing resistance and decreasing effectiveness. In this circumstance, replacement of the filter media is desirable. The filter assembly may be designed to be replaced as a unit, or may be designed such that the coarse and fine filter media can be replaced separately.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A filter assembly comprising:
a housing;
a coarse depth media within the housing;
a valve within the housing arranged in series with the coarse depth media wherein the valve is configured to establish a non-zero flow area in a closed position and to increase the flow area as the valve opens; and a fine depth media within the housing arranged in parallel with the coarse depth media and the valve, the fine depth media having a greater resistance per unit area than a resistance per unit area of the coarse depth media.

2. The filter assembly of claim 1 wherein the fine and coarse filter media are pleated.

3. The filter assembly of claim 1 wherein the valve is passively controlled.

4. The filter assembly of claim 3 wherein the valve is configured to open in response to a differential pressure above a threshold.

5. The filter assembly of claim 4 wherein the valve is a hinge valve.

6. The filter assembly of claim 3 wherein the valve is configured to be closed at an operating temperature and flow rate.

7. A filter assembly comprising:
a housing;
a first filter media within the housing;
a valve within the housing arranged in series with the first filter media, the valve configured to establish a non-zero flow area in a closed position and to increase the flow area as the valve opens; and
a second filter media within the housing arranged in parallel with the first filter media and the valve.

8. The filter assembly of claim 7 wherein the second filter media has a greater resistance per unit area than a resistance per unit area of the first filter media.

9. The filter assembly of claim 7 wherein the valve is passively controlled.

10. The filter assembly of claim 9 wherein the valve is configured to open in response to a pressure differential above a threshold.

11. The filter assembly of claim 10 wherein the valve is a hinge valve.

12. The filter assembly of claim 11 wherein the valve is configured to be closed at an operating temperature and flow rate.

13. The filter assembly of claim 7 wherein the first filter media is a pleated depth media.

14. The filter assembly of claim 7 wherein the second filter media is a pleated depth media.

15. A filter assembly comprising:
a housing;
a first filter media within the housing;
a hinge valve within the housing arranged in series with the first filter media wherein the hinge valve is configured to establish a non-zero flow area in a closed position and to increase the flow area as the hinge valve opens; and
a second filter media within the housing arranged in parallel with the first filter media and the hinge valve.

16. The filter assembly of claim 15 wherein the second filter media has a greater resistance per unit area than a resistance per unit area of the first filter media.

17. The filter assembly of claim 16 wherein the first filter media is a pleated depth media.

18. The filter assembly of claim 16 wherein the second filter media is a pleated depth media.

\* \* \* \* \*